(12) United States Patent
Gonion

(10) Patent No.: US 8,924,693 B2
(45) Date of Patent: Dec. 30, 2014

(54) PREDICTING A RESULT FOR A PREDICATE-GENERATING INSTRUCTION WHEN PROCESSING VECTOR INSTRUCTIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 840 days.

(21) Appl. No.: 13/106,775

(22) Filed: May 12, 2011

(65) Prior Publication Data

US 2012/0191950 A1 Jul. 26, 2012

Related U.S. Application Data

(60) Provisional application No. 61/435,168, filed on Jan. 21, 2011.

(51) Int. Cl.
*G06F 9/30* (2006.01)

(52) U.S. Cl.
CPC ........ *G06F 9/30072* (2013.01); *G06F 9/30036* (2013.01)
USPC .......................................... 712/222; 712/233

(58) Field of Classification Search
CPC combination set(s) only.
See application file for complete search history.

(56) References Cited

U.S. PATENT DOCUMENTS

| 5,864,697 | A  | * | 1/1999  | Shiell .......................... 712/240 |
| 5,935,241 | A  | * | 8/1999  | Shiell et al. .................. 712/240 |
| 6,269,438 | B1 | * | 7/2001  | Chang .......................... 712/233 |
| 7,055,023 | B2 | * | 5/2006  | Tago et al. ................... 712/240 |
| 7,861,071 | B2 | * | 12/2010 | Wilson ......................... 712/234 |
| 8,566,569 | B2 | * | 10/2013 | Bonanno et al. ............. 712/240 |

* cited by examiner

*Primary Examiner* — Eric Coleman
(74) *Attorney, Agent, or Firm* — Park, Vaughan, Fleming & Dowler LLP; Anthony P. Jones

(57) ABSTRACT

The described embodiments include a processor that executes vector instructions. While dispatching instructions at runtime, the processor encounters a predicate-generating instruction. Upon determining that a result of the predicate-generating instruction is predictable, the processor dispatches a prediction micro-operation associated with the predicate-generating instruction, wherein the prediction micro-operation generates a predicted result vector for the predicate-generating instruction. The processor then executes the prediction micro-operation to generate the predicted result vector. When executing the prediction micro-operation to generate the predicted result vector, if the predicate vector is received, for each element of the predicted result vector for which the predicate vector is active, otherwise, for each element of the predicted result vector, generating the predicted result vector comprises setting the element of the predicted result vector to true.

40 Claims, 5 Drawing Sheets

PREDICTING A RESULT FOR A PREDICATE-GENERATING INSTRUCTION WHEN PROCESSING VECTOR INSTRUCTIONS

RELATED APPLICATIONS

This application is a non-provisional application from, and hereby claims priority under 35 U.S.C. §120 to, U.S. provisional patent application 61/435,168, entitled "Predicting a Result for a Predicate-Generating Instruction when Processing Vector Instructions," by inventor Jeffry E. Gonion, filed on 21 Jan. 2011.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009; and (9) pending application Ser. No. 12/541,546, entitled "Running-Shift Instructions for Processing Vectors," by inventors Jeffry E. Gonion and Keith E. Diefendorff, filed 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; and (7) pending application Ser. No. 13/006,243, entitled "Generate Predictes Instruction for Processing Vectors," by inventors Jeffry E. Gonion and Keith E. Diefendorff, filed 13 Jan. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to predicting a result for a predicate-generating instruction when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments provide a processor that executes vector instructions. In the described embodiments, while dispatching instructions at runtime, the processor encounters a predicate-generating instruction. Upon determining that a result of the predicate-generating instruction is predictable, the processor dispatches a prediction micro-operation associated with the predicate-generating instruction, wherein the prediction micro-operation generates a predicted result vector for the predicate-generating instruction. The processor then executes the prediction micro-operation to generate the predicted result vector. In the described embodiments, when executing the prediction micro-operation to generate the predicated result vector, if a predicate vector is received, for each element of the predicted result vector for which the predicate vector is active, otherwise, for each element of the predicted result vector, generating the predicted result vector comprises setting the element of the predicted result vector to a predetermined value (e.g., setting all elements to true or false).

In the described embodiments, upon generating the predicted result vector, the processor records that subsequent vector instructions are being executed speculatively and uses the predicted result vector to execute subsequent vector instructions that depend on the result from the predicate-generating instruction.

In the described embodiments, the processor dispatches and executes the predicate-generating instruction to generate an actual result vector. Then, if the predicate vector is received, for each element of the predicted result vector for which the predicate vector is active, otherwise, for each element of the predicted result vector, the processor compares the element of the predicted result vector to the corresponding element of the actual result vector. The processor next performs a remedial action if the comparison determines that the predicted result vector differs from the actual result vector.

In the described embodiments, the processor maintains a record of an outcome of the comparison, wherein the record comprises a record of a prediction accuracy.

In the described embodiments, when the prediction accuracy is below a threshold value, the processor determines that the result of the predicate-generating instruction is unpredictable and awaits the actual result vector before executing subsequent dependent instructions.

In the described embodiments, the record of the prediction accuracy comprises a confidence level represented by a value between a first value and a second value. In these embodiments, when determining that a result of the predicate-generating instruction is predictable, when the value is closer (i.e., within a predetermined distance from) to the first value, the processor determines that the active elements of the result vector are likely to be set to false. In addition, when determining that a result of the predicate-generating instruction is predictable, when the value is closer to the second value, the processor determines that the active elements of the result vector are likely to be set to true. In these embodiments, when dispatching a prediction micro-operation associated with the predicate-generating instruction, the processor dispatches a prediction micro-operation that sets the active elements of the predicted result vector to the value to which the active elements are determined to be likely to be set.

In the described embodiments, when the confidence level is within a predetermined distance of a midpoint value midway between the first value and the second value, the processor determines that a result of the predicate-generating instruction is unpredictable and awaits the actual result vector before executing subsequent dependent instructions.

In the described embodiments, when the actual result vector includes both true and false elements, the processor adjusts the confidence level toward a midpoint value midway between the first value and the second value. Otherwise, if the actual result vector includes only false elements, the processor adjusts the confidence level toward the first value. Moreover, if the actual result vector includes only true elements, the processor adjusts the confidence level toward the second value.

In the described embodiments, before dispatching subsequent vector instructions that depend on the predicate-generating instruction, the processor modifies the dependency of the subsequent vector instructions from using the actual result vector from the predicate-generating instruction to using the predicted result vector generated by the prediction micro-operation.

In the described embodiments, upon determining that the result is not predictable for the predicate-generating instruction, the processor dispatches the predicate-generating instruction, executes the predicate-generating instruction to generate an actual result vector, and uses the actual result vector to execute subsequent vector instructions that depend on the result from the predicate-generating instruction.

In the described embodiments, when determining that the result of the predicate-generating instruction is predictable, the processor uses one or more factors to determine if the result can be predicted for the predicate-generating instruction.

In the described embodiments, the processor receives a prediction micro-operation decoded from a compiler-inserted prediction instruction.

In the described embodiments, upon determining that a result vector of the predicate-generating instruction is predictable, the processor generates a prediction micro-operation.

In the described embodiments, the predicate-generating instruction comprises a GeneratePredicates instruction or a comparison instruction.

BRIEF DESCRIPTION OF THE FIGURES

In the figures, like reference numerals refer to the same figure elements.

DETAILED DESCRIPTION

Figure 1:
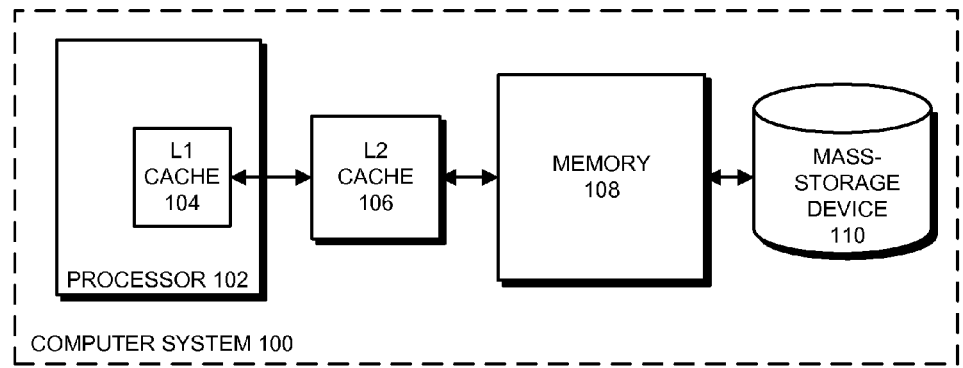
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Macroscalar Architecture

The embodiments described herein are based in part on the Macroscalar Architecture that is described in U.S. patent application Ser. No. 13/006,243, entitled "Generate Predicates Instruction for Processing Vectors," by inventors Jeffry E. Gonion and Keith Diefendorff, filed on 13 Jan. 2011 (hereinafter "the 243 application"), the contents of which are incorporated by reference.

As described in the '243 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

Terminology

Throughout the description, we use the following terminology. These terms may be generally known in the art, but are described below to clarify the subsequent descriptions.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Notation

In describing the embodiments in the instant application, we use the following formats for variables, which are vector quantities unless otherwise noted:

p5=a<b;

Elements of vector p5 are set to 0 or 1 depending on the result of the comparison operation a<b. Note that vector p5 can be a predicate vector that can be used to control the number of elements of one or more vector instructions that execute in parallel.

~p5; a=b+c;
  Only elements in vector a designated by active (i.e., non-zero) elements in the predicate vector p5 receive the result of b+c. The remaining elements of a are unchanged. This operation is called "predication," and is denoted using the tilde ("~") before the predicate vector.

!p5; a=b+c;
  Only elements in vector a designated by active (i.e., non-zero) elements in the predicate vector p5 receive the result of b+c. The remaining elements of a are set to zero. This operation is called "zeroing," and is denoted using the exclamation point ("!") before the predicate vector.

--- if (FIRST( )) goto ...; Also LAST( ), ANY( ), ALL( ), CARRY( ), ABOVE( ), or NONE( ), (where ANY( ) == !NONE( ))

---

These instructions test the processor status flags and branch accordingly.

x+=VECLEN;
  VECLEN is a value that communicates the number of elements per vector. The value is determined at runtime by the processor 102 (see FIG. 1), rather than being determined by the compiler/assembler.

//Comment
  In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments include numerous instructions that can be used to generate predicate vectors. For example, the GeneratePredicates instruction is one such instruction, as are many of the numerous comparison instructions (e.g., VectorGE). This section provides a brief description of the GeneratePredicates instruction and the VectorGE instruction to enable a clearer understanding of the described embodiments.

Although we provide brief descriptions of the GeneratePredicates instruction and the VectorGE instruction, the '243 application includes more detail about these instructions' operations and interactions with other instructions and operations. In addition, although describe the GeneratePredicates instruction and the VectorGE instruction as examples, the prediction operation in the described embodiments can be performed for any vector instruction, scalar instruction, or operation of processor 102 that generates predicates for vector instructions. Moreover, although we use certain arrangements of instructions in describing the function of the GeneratePredicates instruction and the VectorGE instruction, a person of skill in the art will recognize that these concepts may be implemented using different arrangements or types of instructions without departing from the spirit of the described embodiments.

We describe these instructions using a signed-integer data type. However, in alternative embodiments, other data types or formats are used. Moreover, although Macroscalar instructions may take vector, scalar, or immediate arguments in practice, only vector arguments are shown here to avoid redundancy.

In the following examples, predication is communicated to the instructions via two variables. The vector gPred is the predicate vector that affects the instruction and/or the assignment of the result vector. Additionally, some instructions may reference gPred to affect the operation of the instruction apart from the final assignment. If an instruction is not predicated, then all elements are considered active, and the vector gPred contains all true indicators (i.e., the predicate vector is an assumed predicate vector).

Note that the format of the following instruction definitions is a statement of the instruction type followed by a description of the instruction that can include example code as well as one or more usage examples.

GeneratePredicates

This instruction takes a dependency index vector, DIV, and generates predicates corresponding to the next group of elements that may safely be processed in parallel, given the previous group that was processed which is indicated by prev. If no elements of prev are active, predicates are generated for the first group of elements that may safely be processed in parallel. If prev indicates that the final elements of the vector have been processed, then a result vector of inactive predicates is returned.

The definition of GeneratePredicates follows. As shown below, in some embodiments, the instruction processes all elements equivalently; however, predication is performed by the assignment of the result, and should be considered an integral part of this instruction. (Note that GeneratePredicates uses the destination register as one of its inputs.)

---

```
Flags: ZF - Set if no active elements are true.
            Cleared otherwise.
       SF/OF/PF - Indicates whether the
       First/Last/All active elements of the result
       are true
       CF - Indicates Last or None (CF = OF || ZF)
Vector GeneratePredicates(Vector &prev, Vector &index)
{
    Vector r = 0;
    int x, pos;
    for (pos=VECLEN-1; pos>=0; --pos)
        if (prev.v[pos])
            break;
    for (++pos; pos<VECLEN; ++pos) // start at next
    active position
        if (gPred.v[pos])
            break;
    for (x=pos; x<VECLEN; ++x)
    {
        if (index.v[x] > pos) // compare DIV (1-
        based) value to position (0-based)
            break;
        r.v[x] = 1;
    }
    VectorTest(r);
    gCarry = gLast || gNone;
    return(r);
}
```

EXAMPLES

```
~p0; p1 = GeneratePredicates(p1,ix);
On Entry:    p0 =    {1 1 1 1 1 1 1 0}
             p1 =    {0 0 0 0 0 0 0 0}
             ix =    {0 0 0 2 1 3 4 0}
On Exit1:    p1 =    {1 1 1 0 0 0 0 0}
On Entry:    p1 =    {1 1 1 0 0 0 0 0}
On Exit2:    p1 =    {0 0 0 1 1 1 0 0}
On Entry:    p1 =    {0 0 0 1 1 1 0 0}
On Exit3:    p1 =    {0 0 0 0 0 0 1 0}
```

VectorGE

This instruction compares active vector elements and returns a result vector indicating whether the elements of the first parameter are greater-than or equal-to elements of the second parameter. Inactive elements either remain unmodified, or are forced to zero, depending on the nature of the predication. This implementation of the instruction takes the result vector as an input and performs predication explicitly.

```
Flags:  ZF - Set if no active elements are true.
            Cleared otherwise.
        SF/OF/PF - Indicates whether the
        First/Last/All active elements of the result
        are true.
Vector VectorGE (const Vector &ob, const Vector &val)
{
    Vector result;
    for (int x=0; x=VECLEN; ++x)
        result.v[x] = (ob.v[x] >= val.v[x]);
    VectorTest(result);
    return(result);
}
```

EXAMPLES:

```
~p0; a = (b >= c);
On Entry:    p0 =    {0 0 1 1 1 1 0 0}
             a =     {9 9 9 9 9 9 9 9}
             b =     {8 7 6 5 4 3 2 1}
             c =     {0 1 2 3 4 5 6 7}
On Exit:     a =     {9 9 1 1 1 0 9 9}
!p0; a = (b >= c);
On Entry:    p0 =    {0 0 1 1 1 1 0 0}
             a =     {9 9 9 9 9 9 9 9}
             b =     {8 7 6 5 4 3 2 1}
             c =     {0 1 2 3 4 5 6 7}
On Exit:     a =     {0 0 1 1 1 0 0 0}
```

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
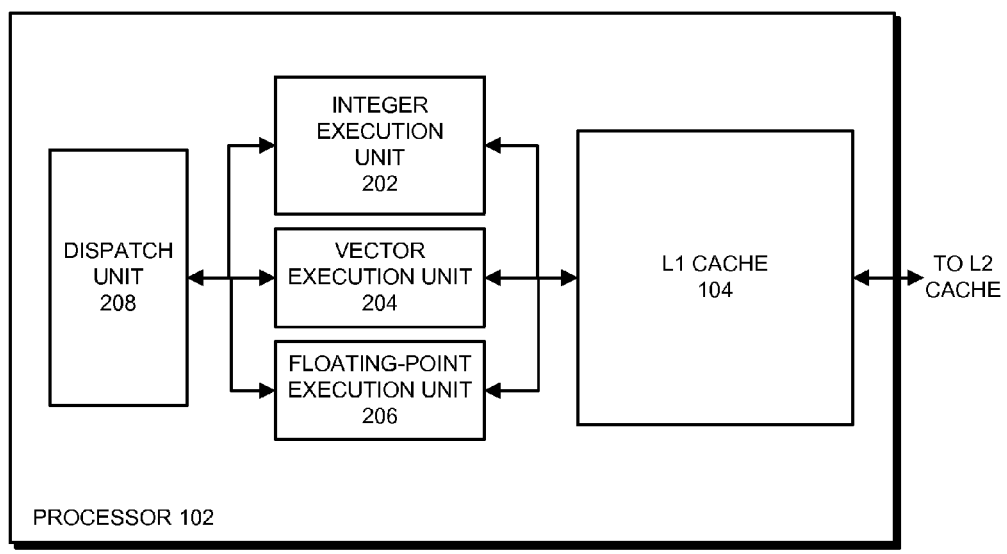
FIG. 2 presents an expanded view of a processor in accordance with the described embodiments.

FIG. 2 presents an expanded view of processor 102 in accordance with the described embodiments. As is shown in FIG. 2, processor 102 includes L1 cache 104, dispatch unit 208, integer execution unit 202, floating-point execution unit 206, and vector execution unit 204 (integer execution unit 202, floating-point execution unit 206, and vector execution unit 204 as a group are interchangeably referred to as "the execution units").

Dispatch unit 208 receives decoded instructions from a decode unit (not shown) in processor 102 and dispatches the decoded instructions to the appropriate execution units. Dispatch unit 208 is described in more detail below with respect to FIG. 4.

Each of execution units 202-206 is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
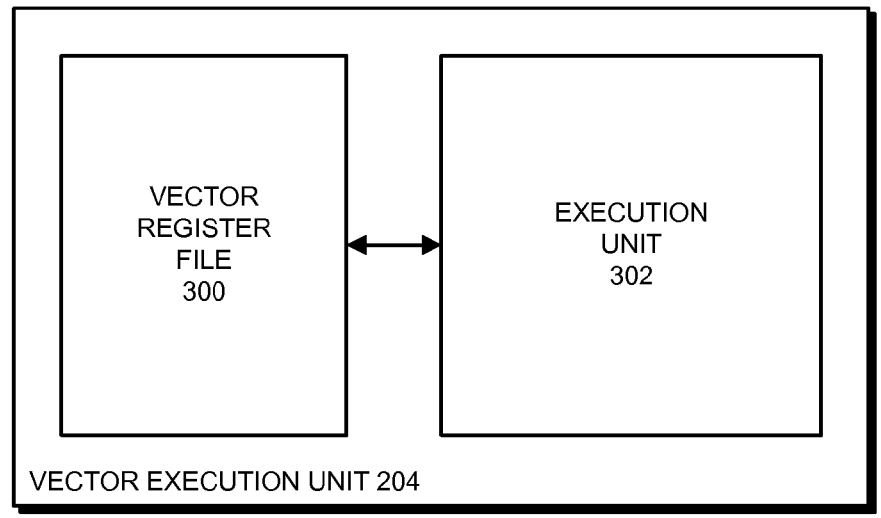
FIG. 3 presents an expanded view of a vector execution unit in accordance with the described embodiments.

In the described embodiments, vector execution unit 204 is a single-instruction-multiple-data (SIMD) execution unit that performs operations in parallel on some or all of the data elements that are included in vectors of operands. FIG. 3 presents an expanded view of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, doublewords, etc.). In these embodiments, execution unit 302 can perform operations on Nor fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Figure 4:
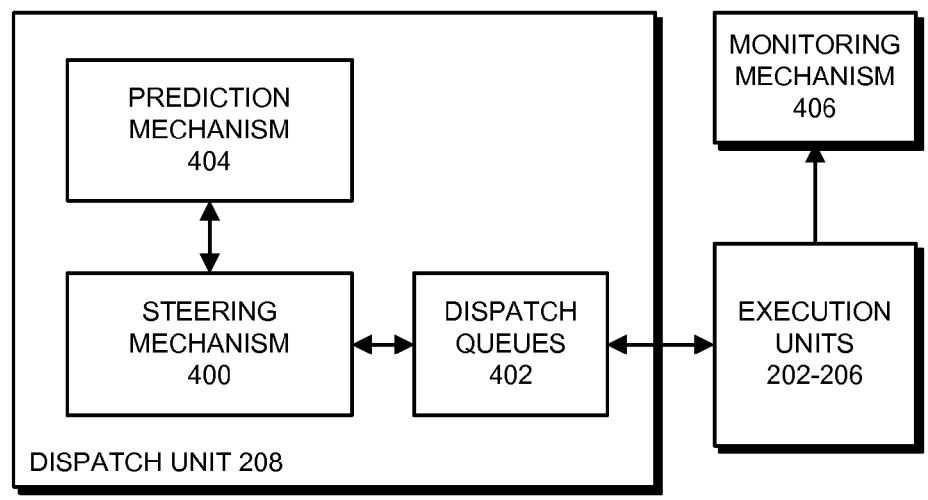
FIG. 4 presents a block diagram of a dispatch unit and a monitoring mechanism in accordance with some embodiments.

FIG. 4 presents a block diagram of dispatch unit 208 and monitoring mechanism 406 in accordance with some embodiments. As can be seen in FIG. 4, dispatch unit 208 includes steering mechanism 400 and dispatch queues 402. Steering mechanism 400 and dispatch queues 402 are used for dispatching decoded instructions to execution units 202-206. Dispatch queues 402 includes a first-in-first-out (FIFO) dispatch queue for each of the execution units. As each decoded instruction is received from the decode unit, steering mechanism 400 determines the appropriate execution unit for the instruction (e.g., floating-point execution unit 206 for floating-point instructions, etc.) and "steers" the instruction to corresponding execution unit by placing the instruction in a next available position in the dispatch queue for the execution unit. Dispatch unit 208 can then release an instruction per cycle from each of the dispatch queues to the corresponding execution unit for execution.

In addition to the mechanisms for dispatching decoded instructions, dispatch unit 208 includes prediction mechanism 404. Generally, given a predicate-generating instruction, prediction mechanism 404 determines if the values in a resulting predicate vector are predictable and, if so, dispatches a prediction micro-operation to vector execution unit 204 to be executed. When executed, the prediction micro-operation generates a predicted result vector for the predicate-generating instruction in which all of the active elements are set to a given predicted value (e.g., true, false, zero, non-zero, etc.). The predicted result vector can then be used as a predicate vector for executing one or more subsequent dependent instructions. (Note that, as described below, the prediction micro-operation can be generated by prediction mechanism 404 or can be decoded from a compiler-inserted prediction instruction.)

Processor 102 also includes monitoring mechanism 406, which includes mechanisms for handling the execution of subsequent vector instructions based on the predicted result vector, determining if the prediction was correct, performing remedial actions if the prediction was incorrect, and keeping one or more records regarding the outcome of the prediction that can be used in making subsequent predictions.

Note that, although we show prediction mechanism 404 as being included in dispatch unit 208, and monitoring mechanism 406 as a separate mechanism, in some embodiments, some or all of the mechanisms are arranged differently. For example, some or all of monitoring mechanism 406 can be included in dispatch unit 208 and/or in execution units 202-206.

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a branch unit, a memory management unit, I/O interfaces, etc. coupled to the execution units. The additional functional blocks that can be present in processor 102 are known in the art and are not described in more detail.

Prediction of Predicate Vectors

Generally, in Macroscalar processors (i.e., in processors based on the Macroscalar architecture), iterations of loops can be executed in parallel using corresponding elements of a vector instruction. As described above, in these processors, the vector instructions can be partitioned so that only elements that can safely be operated on in parallel are operated on by a vector instruction. This "vector partitioning" is determined based on a run-time analysis. During the run-time analysis, the Macroscalar processor can execute a predicate-generating instruction to generate a predicate vector in which active elements indicate elements that can be safely operated on in parallel. Then, while performing subsequent operations, the predicate vector can then be used by the processor to control which elements of the vector are operated on in parallel.

However, for some loops, during the run-time analysis, the processor almost always determines that all of the elements of the vector instruction can be safely operated on in parallel. In such loops, the runtime analysis is performed for correctness, but rarely, if ever, generates a predicate vector for which all of the active elements are not set in the same way (e.g., true, false, zero, non-zero, etc.). Thus, the operations for the loop are delayed while the processor performs the largely needless runtime analysis—which affects the processor's performance.

In order to avoid the effect on performance caused by waiting for the execution of the predicate-generating instruction to complete, in the described embodiments, processor 102 can generate (or set) a predicted result for predicate-generating instructions. More specifically, in these embodiments, processor 102 determines when the result vector generated by a predicate-generating instruction can be predicted to contain a given value in each active element (i.e., are predictable). Based on the prediction, processor 102 generates (or sets) a predicted result vector for the predicate-generating instruction in which each active element contains the given value. Processor 102 can then immediately execute subsequent instructions using the predicted result vector.

However, when using the predicted result vector to execute subsequent instructions, processor 102 records that the execution is speculative. When the actual result returns from executing the predicate-generating instruction (i.e., the predicate-generating instruction for which the result was predicted), processor 102 checks the actual result against the predicted result. If the actual result and the predicted result do not match, processor 102 can discard the results from instructions executed using the predicted result vector and perform a remedial action. In some embodiments, when performing the remedial action, processor 102 recovers the processor state and restarts execution of instructions at the instruction following the predicted predicate-generating instruction using the actual result.

Figure 5:
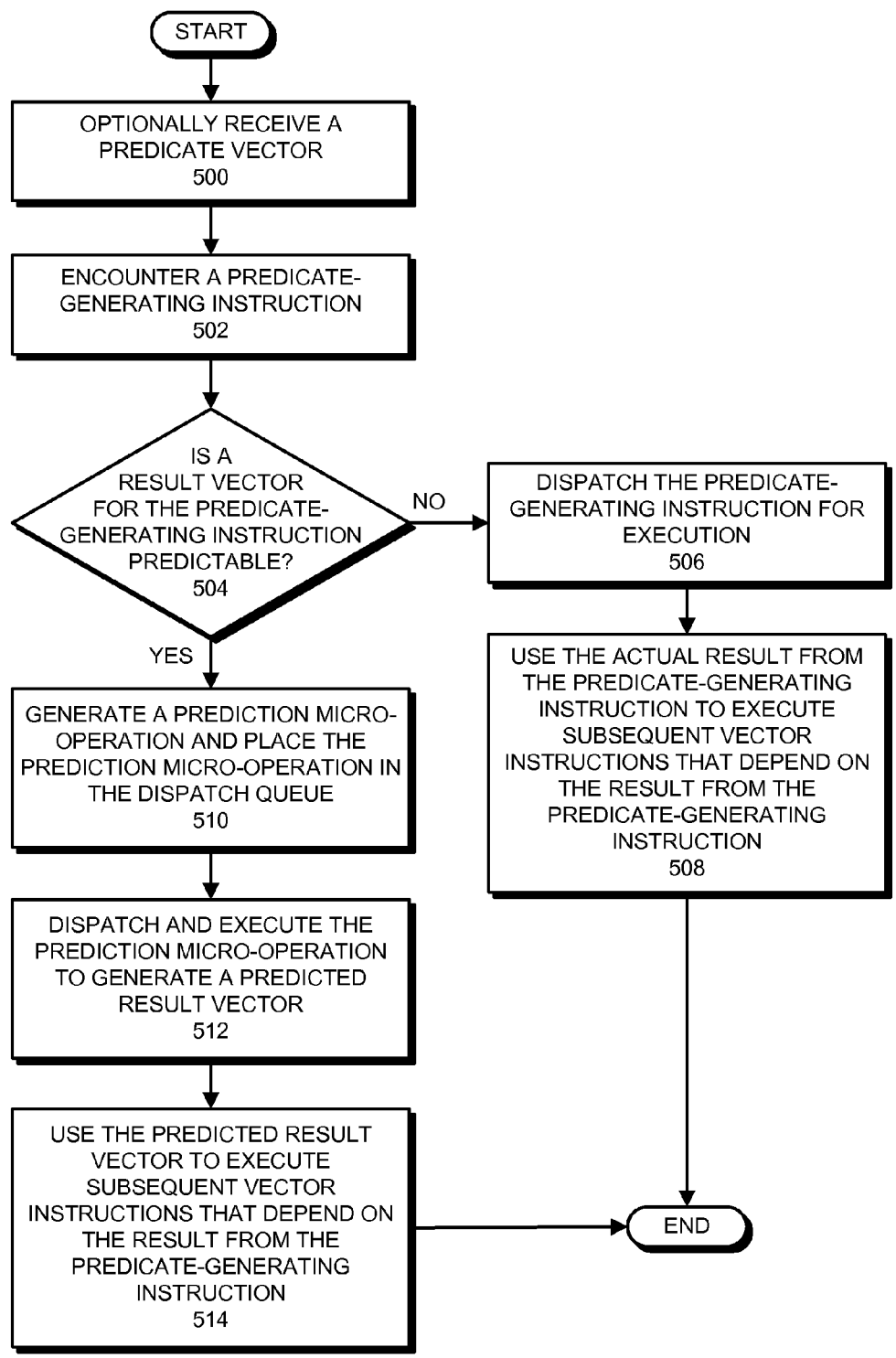
FIG. 5 presents a flowchart illustrating a process for predicting the result of a predicate-generating instruction using a hardware prediction mechanism in accordance with the described embodiments.

Predicting a Result for a Predicate-Generating Instruction Using Hardware Prediction FIG. 5 presents a flowchart illustrating a process for predicting the result of a predicate-generating instruction using a hardware prediction mechanism 404 in processor 102 in accordance with the described embodiments.

The process shown in FIG. 5 starts when processor 102 optionally receives a predicate vector (step 500). Recall that processor 102 uses active elements of the predicate vector to determine the elements of a predicate-generating instruction (see step 502) for which result vector elements are generated. However, if processor 102 does not receive a predicate vector, processor 102 assumes a predicate vector for which all elements are active, and performs the following operations for each element of the predicate-generating instruction. Note also that the predicate vector, be it received or assumed, is originally associated with the predicate-generating instruction, but is also used in predicting the result vector for the predicate-generating instruction—if such a prediction is made.

Prediction mechanism 404 then encounters a predicate-generating instruction (step 502). In the embodiments described with respect to FIG. 5, prediction mechanism 404 encounters the predicate-generating instruction while monitoring instructions that are received by steering mechanism 400. In these embodiments, prediction mechanism 404 monitors the instructions to determine when a predicate-generating instruction is to be dispatched. For example, prediction mechanism 404 can monitor the instructions for a GeneratePredicates instruction, a comparison instruction such as a vector GE instruction, or another instruction that generates a predicate vector.

Next, prediction mechanism 404 determines if a result vector for the predicate-generating instruction is predictable (step 504). In making the determination, prediction mechanism 404 determines whether it is likely that all of the active elements of a result vector generated by the predicate-generating instruction will be set to true, false, zero, non-zero, or another value.

The determination whether a result vector for the predicate-generating instruction is predictable that is made by prediction mechanism 404 can be based on one or more factors. Generally, any factor that can be used to characterize the predicate-generating instruction (e.g., the type, address, inputs, outputs, etc. of the predicate-generating instruction), the history of instruction execution (i.e., the predicate-generating instruction itself and/or other instructions), the past or current state of processor 102, etc. can be used in predicting the result vector of the predicate-generating instruction. As examples, prediction mechanism 404 can make the prediction based on one or more of the following factors: (1) a record in processor 102 indicates that the predicate-generating instruction generated a result vector for which all of the active elements were set to a predetermined value when executed one or more previous times; (2) a table lookup computed from an address of the predicate-generating instruction returns a confirmation that the active elements of a result vector from the predicate-generating instruction are all likely to be set to the predetermined value; (3) one or more processor tracking mechanisms are set to indicate that the active elements of a result vector from the predicate-generating instruction are all likely to be set to the predetermined value; (4) a computation made by a prediction computation mechanism (e.g., a fuzzy logic, processor, neural network, etc.) in prediction mechanism 404 indicates that the active elements of a result vector from the predicate-generating instruction are all likely to be set to the predetermined value; (5) the variant of the predicate-generating instruction being predicted indicates that the active elements of the result vector from the predicate-generating instruction are all likely to be set to the predetermined value; (6) the addresses of one or more prior instructions of a given type that preceded the predicate-generating instruction indicate that the active elements of the result vector from the predicate-generating instruction are all likely to be set to the predetermined value; (7) one or more factors related to executing instructions prior to the predicate-generating instruction (a code-path history) indicate that the active elements of the result vector from the predicate-generating instruction are all likely to be set to the predetermined value; (8) a pattern of taken or not-taken branches for a number of branches that preceded the predicate-generating instruction that is being predicted indicates that the active elements of the result vector from the predicate-generating instruction are all likely to be set to the predetermined value; (9) a value of counter indicating the number of occurrences of an event (e.g., a prior prediction) indicates that the active elements of the result vector from the predicate-generating instruction are all likely to be set to the predetermined value; or (10) a value of a variable representing a confidence level of predicting the predicate-generating instruction, in which the confidence level is adjusted based on the relationship between at least one prior prediction, indicates that the active elements of the result vector from the predicate-generating instruction are all likely to be set to the predetermined value. In these embodiments, prediction mechanism 404 can store a value that represents each factor to be used in making a decision and then can perform one or more mathematical, logical, combinatory, comparison, or algorithmic operations using the values to make the determination.

In addition, when making the determination whether a result vector is predictable (i.e., can be predicted), prediction mechanism 404 can determine that all active elements in the result vectors for all predicate-generating instructions are to be predicted in the same way. That is, predict that the active elements in the result vector will each contain the same value (e.g., true, false, zero, non-zero, etc.). In some embodiments, the prediction can be made without considering any of the above-described factors, i.e., can be automatic.

In the described embodiments, prediction mechanism 404 can include one or more variables, memory locations, registers, lookup tables, status flags/indicators, functional blocks, or other mechanisms or circuit structures that are used to hold values representing the factors to enable prediction mechanism 404 to determine if a result vector for the predicate-generating instruction is predictable. Prediction mechanism 404 can use these mechanisms to maintain records of the one or more factors that are used in making the determination. Prediction mechanism 404 and/or processor 102 can additionally compute values to be used by prediction mechanism 404 for making the determination. These values can be computed at the time that the determination is to be made or can be automatically computed whenever a relevant event occurs and stored in one or more of the mechanisms in prediction mechanism 404.

In these embodiments, if prediction mechanism 404 determines that a result vector for the predicate-generating instruction cannot be predicted with sufficient likelihood of success, prediction mechanism 404 does not predict the result vector (step 504). For example, prediction mechanism 404 can determine that the result of the predicate-generating instruction cannot be predicted if it is likely that the result vector include both true and false values, or if it is not sufficiently clear whether all of the values of the result vector will be all true or all false based on the one or more factors used in making the determination. In the event that the result vector cannot be predicted, the predicate-generating instruction is dispatched and executed (step 506), and processor 102 awaits the actual result vector from the predicate-generating instruction to be used as an input for subsequent instructions (step 508). Note that in this case, prediction mechanism 404 does not generate/dispatch the prediction micro-operation that is described in more detail below.

Upon determining that a result vector for the predicate-generating instruction is predictable (step 504), prediction mechanism 404 generates a prediction micro-operation and places the prediction micro-operation in the dispatch queue for vector execution unit 204 (step 510). More specifically, upon determining that the active elements in the result vector for the predicate-generating instruction are all likely to be set to a given value, prediction mechanism 404 generates a prediction micro-operation that generates a result vector in which each active element is set to the given value and places the prediction micro-operation in the dispatch queue before the predicate-generating instruction. Note that the predicate-generating instruction is also placed in the dispatch queue (albeit after the prediction micro-operation) because the predicate-generating instruction is also executed to generate an actual result vector for comparison with the predicted result vector generated by the prediction micro-operation.

In the described embodiments, the prediction micro-operation, when executed, causes vector execution unit 204 to generate a result vector for which each active element is set to a predetermined value (recall that the predicate vector for the predicate-generating instruction described with respect to step 500 is used to determine the active elements for the prediction micro-operation). The predetermined value to which each active element of the result vector is set depends on the variant of the prediction micro-operation. In some embodiments, the prediction micro-operation comes in two variants, an all-true variant that generates a result vector for which each active element is set to true, and an all-false variant that generates a result vector for which each active element is set to false. Although we describe all-true and all-false variants of the prediction micro-operation, some embodiments include more and/or different variants of the prediction micro-operation.

When the prediction micro-operation eventually arrives at the head of the dispatch queue, dispatch unit 208 dispatches the prediction micro-operation to vector execution unit 204 to be executed and generate the predicted result vector (step 512). Unlike the predicate-generating instruction, the prediction micro-operation has no dependencies (aside from a predicate vector, which is either available before the prediction micro-operation is dispatched or is assumed). Thus, as soon as the prediction micro-operation is received in vector execution unit 204, it can be executed to generate the predicted result vector. In contrast, the predicate-generating instruction may be stalled in dispatch unit 208 and/or in the execution unit 204 until dependency for the predicate-generating instruction can be resolved. Generally, this means that the prediction micro-operation, which both executes first and has no dependencies, can generate a predicted result vector before the actual predicate vector can be generated by the predicate-generating instruction. Note that, although the prediction micro-operation is executed to generate the predicted result vector, the predicate-generating instruction is still dispatched and executed to generate an actual result vector that is eventually compared to the predicted result vector as a verification of the prediction.

Processor 102 then uses the predicted result vector to execute subsequent vector instructions that depend on the result from the predicate-generating instruction (step 514). In some embodiments, after generating the predicted result vector, while dispatching one or more subsequent vector instructions that depend on the result of the predicate-generating instruction (i.e., that use the predicate vector generated by the predicate-generating instruction), processor 102 modifies the dependency of the subsequent vector instructions so that the subsequent vector instructions use the predicted result vector output from the prediction micro-operation instead of the actual result vector output from the predicate-generating instruction. Thus, the subsequent instructions use the predicted result vector as an input instead of using the actual result vector generated by the predicate-generating instruction.

As described below, using the predicted result vector includes performing other operations to ensure that the prediction was correct and to perform remedial actions when the prediction was incorrect.

Figure 6:
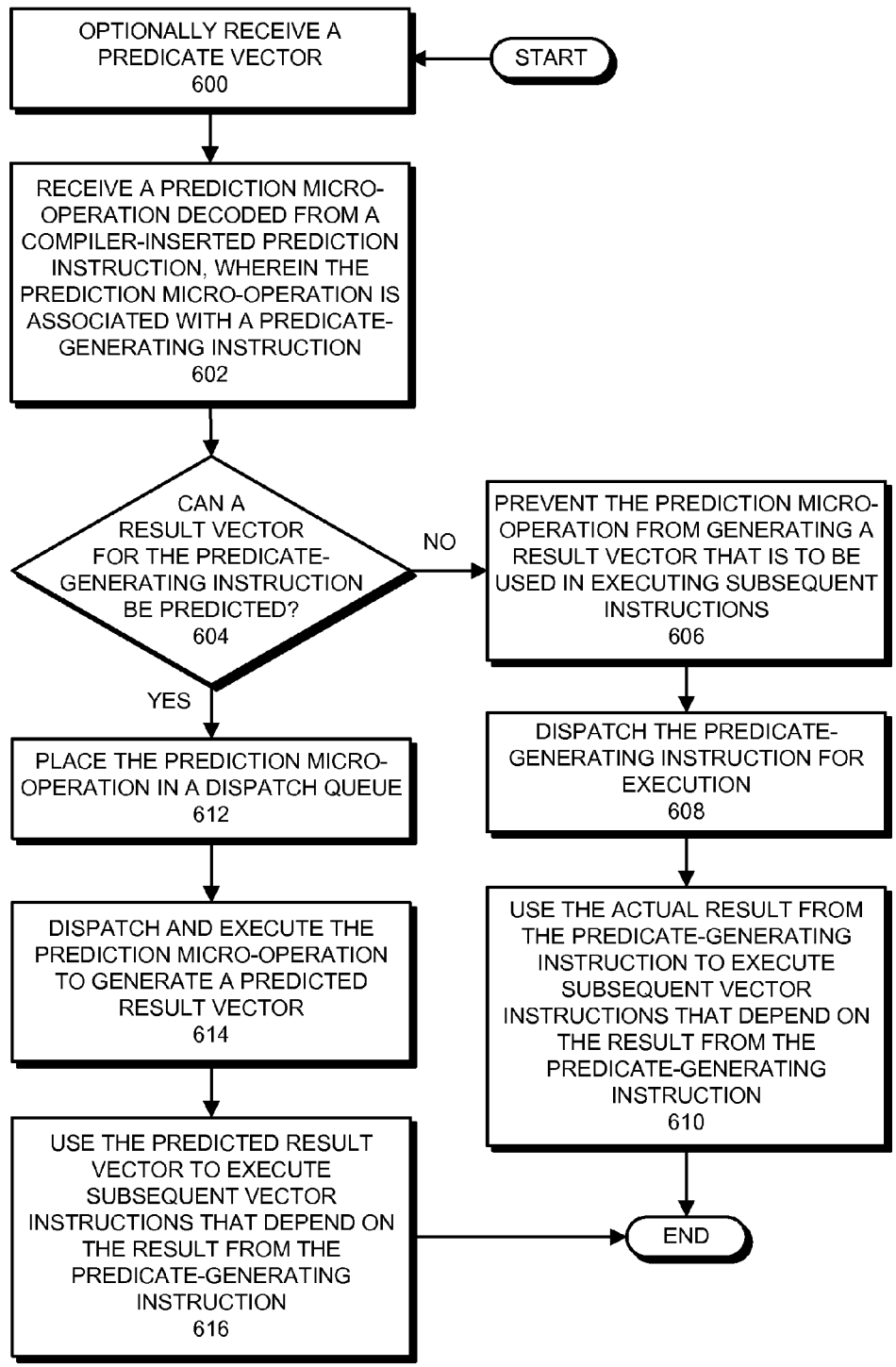
FIG. 6 presents a flowchart illustrating a process for predicting the result of a predicate-generating instruction using a compiler-inserted prediction instruction in accordance with the described embodiments.

Predicting a Result for a Predicate-Generating Instruction using a Compiler-Inserted Prediction Instruction FIG. 6 presents a flowchart illustrating a process for predicting the result of a predicate-generating instruction using a compiler-inserted prediction instruction in accordance with the described embodiments. In the embodiments shown in FIG. 6, during a compilation process, a compiler inserts prediction instructions that are each associated with a corresponding predicate-generating instruction. The prediction instructions, when decoded at runtime, generate corresponding prediction micro-operations. The prediction micro-operation, if dispatched and executed, generates a predicted result vector for the associated predicate-generating instruction.

The embodiments shown in FIG. 6 differ from the embodiments shown in FIG. 5 in that the prediction micro-operation is not generated by prediction mechanism 404 following a determination whether the predicate-generating instruction is predictable. In addition, in some of the embodiments shown in FIG. 6, prediction mechanism 404 does not monitor instructions to determine when a predicate-generating instruction has been encountered. Instead, in these embodiments, prediction mechanism 404 simply processes compiler-inserted prediction micro-operations. Thus, prediction mechanism 404 may include less mechanisms/functional blocks in the embodiments shown in FIG. 6 (although the compiler in these embodiments includes code/logic for generating prediction instructions).

The process shown in FIG. 6 starts when processor 102 optionally receives a predicate vector (step 600). Recall that processor 102 uses active elements of the predicate vector to determine the elements of a predicate-generating instruction (see step 602) for which result vector elements are generated. However, if processor 102 does not receive a predicate vector, processor 102 assumes a predicate vector for which all elements are active, and performs the following operations for each element of the predicate-generating instruction. Note also that the predicate vector, be it received or assumed, is originally associated with the predicate-generating instruction, but is also used in predicting the result vector for the predicate-generating instruction—if such a prediction is made.

Prediction mechanism 404 then receives a prediction micro-operation decoded from a compiler-inserted prediction instruction, wherein the prediction micro-operation is associated with a prediction-generating instruction (step 602). As described above, the compiler inserts the prediction instruction in the program code relative to the predicate-generating instruction during compilation based on an analysis of the program code.

Recall that, in some embodiments, the prediction micro-operation comes in variants that generate a result vector for which the active elements are set to a given value (e.g., true, false, zero, non-zero, etc.). Thus, in some embodiments, the compiler additionally selects a predicted result value for all the active elements in the result vector generated by the prediction instruction. The selection of the result value for all the active elements in the result vector is reflected in the prediction micro-operation that is generated by decoding the compiler-inserted prediction instruction.

Next, prediction mechanism 404 determines if a result vector for the predicate-generating instruction can be predicted (step 604). For example, prediction mechanism 404 can determine whether it is likely that all of the active elements of a result vector generated by the predicate-generating instruction will be set to true, false, zero, non-zero, or another value. In these embodiments, making the determination can include predicting whether the result vector is likely to contain the value indicated by the prediction micro-operation.

The determination whether a result vector for the predicate-generating instruction is predictable that is made by prediction mechanism 404 can be based on one or more factors. Generally, any factor that can be used to characterize the predicate-generating instruction (e.g., the type, address, inputs, outputs, etc. of the predicate-generating instruction), the history of instruction execution (i.e., the predicate-generating instruction itself and/or other instructions), the past or current state of processor 102, etc. can be used in predicting the result vector of the predicate-generating instruction. Some exemplary factors are listed above in the description of FIG. 5.

In addition, when making the determination whether a result vector is predictable (i.e., can be predicted), prediction mechanism 404 can determine that all active elements in the result vectors for all predicate-generating instructions are to be predicted in the same way. That is, predict that the active elements in the result vectors will each contain the same value (e.g., true, false, zero, non-zero, etc.). In some embodiments, the prediction can be made without considering any of the above-described factors, i.e., can be automatic.

In the described embodiments, prediction mechanism 404 can include one or more variables, memory locations, registers, lookup tables, status flags/indicators, functional blocks, or other mechanisms or circuit structures that are used to hold values representing the factors to enable prediction mechanism 404 to determine if a result vector for the predicate-generating instruction is predictable. Prediction mechanism 404 can use these mechanisms to maintain records of the one or more factors that are used in making the determination. Prediction mechanism 404 and/or processor 102 can additionally compute values to be used by prediction mechanism 404 for making the determination. These values can be computed at the time that the determination is to be made or can be automatically computed whenever a relevant event occurs and stored in one or more of the mechanisms in prediction mechanism 404.

In these embodiments, if prediction mechanism 404 determines that a result vector for the predicate-generating instruction cannot be predicted with sufficient likelihood of success, prediction mechanism 404 does not predict the result vector (step 604). For example, prediction mechanism 404 can determine that the result of the predicate-generating instruction cannot be predicted if it is likely that the result vector include both true and false values, or if it is not sufficiently clear whether all of the values of the result vector will be true or false based on the one or more factors used in making the determination.

In the event that the result vector cannot be predicted, prediction mechanism 404 prevents the prediction micro-operation from generating a result vector that is to be used in executing subsequent instructions (step 606). For example, prediction mechanism 404 can prevent the prediction micro-operation from being placed in the dispatch queue, can invalidate the prediction micro-operation (i.e., set an indicator in processor 102 that the prediction micro-operation is invalid), can cause the result of the prediction micro-operation to be invalidated or deleted, or can perform another operation to prevent the result of the prediction micro-operation from affecting subsequent execution. Dispatch unit 208 then dispatches the predicate-generating instruction for execution (step 608). Next, processor 102 awaits the actual result vector from the predicate-generating instruction to be used as a predicate vector for subsequent instructions (step 610).

Upon determining that a result vector for the predicate-generating instruction can be predicted (step 604), prediction mechanism 404 places the prediction micro-operation in the dispatch queue for vector execution unit 204 (step 612). Note that the predicate-generating instruction is also placed in the dispatch queue (albeit behind the prediction micro-operation) because the predicate-generating instruction is also executed to generate an actual result vector for comparison with the predicted result vector generated by the prediction micro-operation.

When the prediction micro-operation eventually arrives at the head of the dispatch queue, dispatch unit 208 dispatches the prediction micro-operation to vector execution unit 204 to be executed and generate the predicted result vector (step 614). As described above with respect to FIG. 5, unlike the predicate-generating instruction, the prediction micro-operation has no dependencies (aside from a predicate vector, which is either available before the prediction micro-operation is dispatched or is assumed). Thus, as soon as the prediction micro-operation is received in vector execution unit 204, it can be executed to generate the predicted result vector.

Processor 102 then uses the predicted result vector to execute subsequent vector instructions that depend on the result from the predicate-generating instruction (step 616). In some embodiments, after generating the predicted result vector, while dispatching one or more subsequent vector instructions that depend on the result of the predicate-generating instruction (i.e., that use the predicate vector generated by the predicate-generating instruction), processor 102 modifies the dependency of the subsequent vector instructions so that the subsequent vector instructions use the predicted result vector output from the prediction micro-operation instead of the actual result vector output from the predicate-generating instruction. Thus, the subsequent instructions use the predicted result vector as an input instead of using the actual result vector generated by the predicate-generating instruction.

As described below, using the predicted result vector includes performing other operations to ensure that the prediction was correct and to perform remedial actions when the prediction was incorrect.

Figure 7:
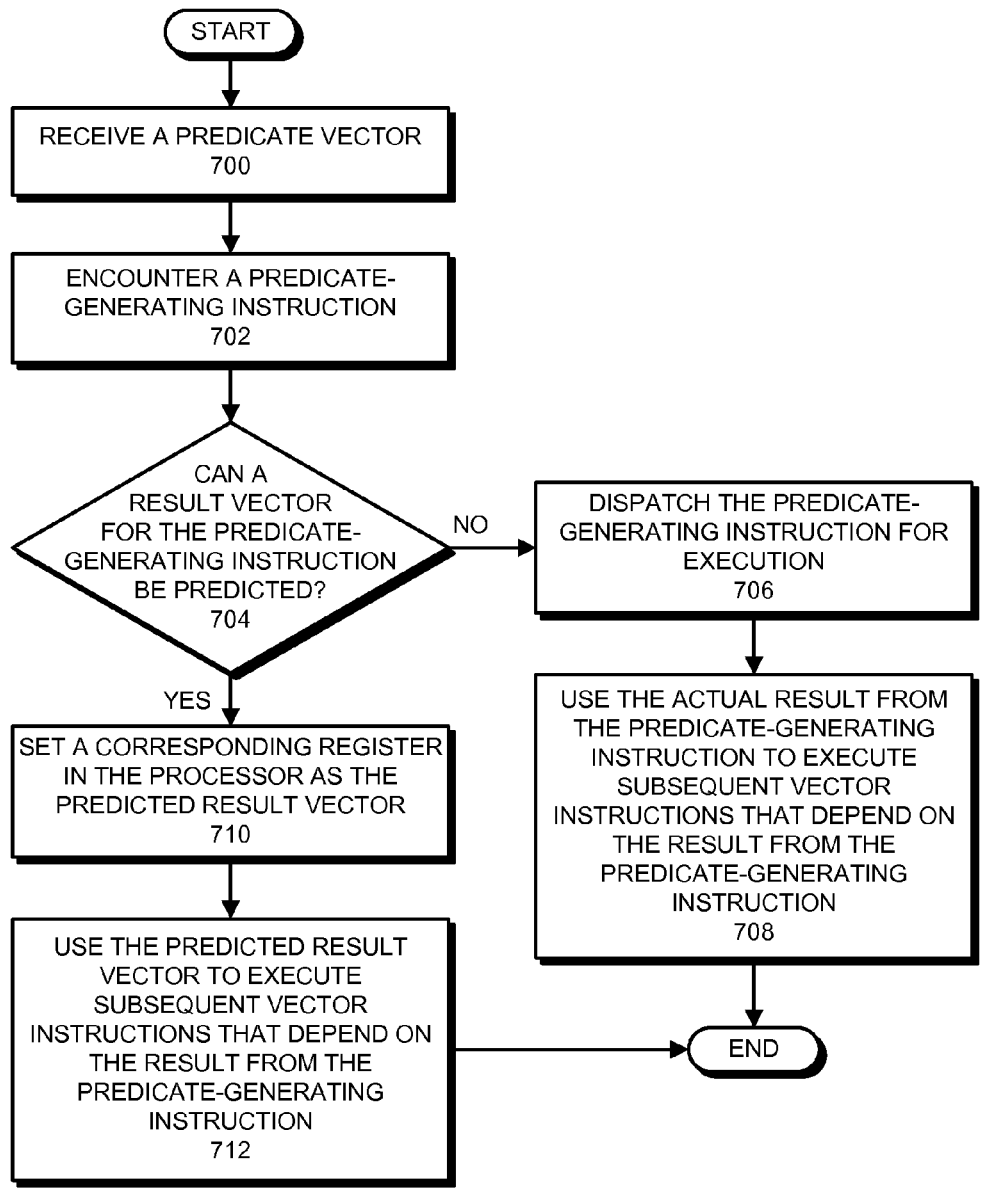
FIG. 7 presents a flowchart illustrating a process for predicting the result of a predicate-generating instruction and using a value in a corresponding processor register as a predicted result vector in accordance with the described embodiments.

Using a Value from a Processor Register as a Predicted Result Vector when Predicting a Result for a Predicate-Generating Instruction FIG. 7 presents a flowchart illustrating a process for predicting the result of a predicate-generating instruction and using a value in a corresponding processor register as the predicted result vector in accordance with the described embodiments.

The embodiments shown in FIG. 7 differ from the embodiments shown in FIGS. 5-6 in that a prediction micro-operation is not executed to generate the predicted result vector. In fact, in the embodiments shown in FIG. 7, a separate predicted result vector is not generated. Instead, the processor uses a value in a processor register as the predicted result vector for the predicate-generating instruction. In these embodiments, upon determining that the predicate-generating instruction is predictable, prediction mechanism 404 uses an existing processor register that holds a corresponding value as the predicted result vector. For example, assuming that the prediction is that the active elements of the result vector for the predicate-generating instruction will all be set to true and that the predicate vector resides in a given vector register, prediction mechanism 404 simply causes processor 102 (e.g., dispatch unit 208, execution units 202-206, etc.) to use the value in the vector register as the predicted result vector for the predicate-generating instruction. As another example, assuming that the prediction is that the active elements of the result vector for the predicate-generating instruction will all be set to false, prediction mechanism 404 causes processor 102 (e.g., dispatch unit 208, execution units 202-206, etc.) to use a value in a predetermined vector register for which each element contains a false value as the predicted result vector for the predicate-generating instruction. Thus, prediction mechanism 404 uses a value that is already present in a vector register as the predicted result vector for the predicate-generating instruction. In the embodiments shown in FIG. 7, prediction mechanism 404 and/or processor 102 may include different mechanisms/functional blocks than the embodiments shown in FIGS. 5-6.

Note that, for the prediction shown in FIG. 7, if a predicate vector is not received, no prediction (of all elements in the result vector being true) is made, and the predicate-generating instruction can be executed to generate an actual result vector.

The process shown in FIG. 7 starts when processor 102 receives a predicate vector (step 700) (interchangeably called a "control predicate"). Recall that processor 102 uses active elements of the predicate vector to determine the elements of a predicate-generating instruction for which result vector elements are generated. Note also that the predicate vector is originally associated with the predicate-generating instruction, but can also used as the predicated result vector for the predicate-generating instruction when the active elements of the result vector for the predicate-generating instruction can be predicted to be all true. Moreover, the predicate vector that is "received" by processor 102 is value in a processor register that was generated as a result of one or more prior operations.

Prediction mechanism 404 then encounters a predicate-generating instruction (step 702). In the embodiments described with respect to FIG. 7, prediction mechanism 404 encounters the predicate-generating instruction while monitoring instructions that are received by steering mechanism 400. More specifically, prediction mechanism 404 monitors decoded instructions received by steering mechanism 400 to determine when steering mechanism 400 has received a predicate-generating instruction for dispatch.

Next, prediction mechanism 404 determines if a result vector for the predicate-generating instruction is predictable (step 704). In making the determination, prediction mechanism 404 determines whether it is likely that all of the active elements of a result vector generated by the predicate-generating instruction will be set to a predetermined value (e.g., true, false, or another value).

The determination whether a result vector for the predicate-generating instruction is predictable that is made by prediction mechanism 404 can be based on one or more factors. Generally, any factor that can be used to characterize the predicate-generating instruction (e.g., the type, address, inputs, outputs, etc. of the predicate-generating instruction), the history of instruction execution (i.e., the predicate-generating instruction itself and/or other instructions), the past or current state of processor 102, etc. can be used in predicting the result vector of the predicate-generating instruction. Some exemplary factors are listed above in the description of FIG. 5.

In addition, when making the determination whether a result vector is predictable, prediction mechanism 404 can determine that all active elements in the result vectors for all predicate-generating instructions are to be predicted in the same way. That is, predict that the active elements in the result vectors for every predicate-generating instruction will each be set to the predetermined value. In some embodiments, the prediction can be made without considering any of the above-described factors, i.e., can be automatic.

In the described embodiments, prediction mechanism 404 can include one or more variables, memory locations, registers, lookup tables, status flags/indicators, functional blocks, or other mechanisms or circuit structures that are used to hold values representing the factors to enable prediction mechanism 404 to determine if a result vector for the predicate-generating instruction is predictable. Prediction mechanism 404 can use these mechanisms to maintain records of the one or more factors that are used in making the determination. Prediction mechanism 404 and/or processor 102 can additionally compute values to be used by prediction mechanism 404 for making the determination. These values can be computed at the time that the determination is to be made or can be automatically computed whenever a relevant event occurs and stored in one or more of the mechanisms in prediction mechanism 404.

In these embodiments, if prediction mechanism 404 determines that a result vector for the predicate-generating instruction cannot be predicted with sufficient likelihood of success (step 704), prediction mechanism 404 does not predict the result vector. For example, prediction mechanism 404 can determine that the result of the predicate-generating instruction cannot be predicted if it is not sufficiently clear whether all of the values of the result vector will be set to the predetermined value based on the one or more factors used in making the determination. In the event that the result vector cannot be predicted, the predicate-generating instruction is dispatched and executed (step 706), and processor 102 awaits the actual result vector from the predicate-generating instruction to be used as an input for subsequent instructions (step 708).

Upon determining that a result vector for the predicate-generating instruction is predictable (step 704), prediction mechanism 404 predicts the result vector. More specifically, prediction mechanism 404 determines that all of the active elements of the result vector for the predicate-generating instruction can be predicted to be set to the predetermined value, and sets a corresponding register in processor 102 as the predicted result vector (step 710). For example, if prediction mechanism 404 determines that all of the active elements of the result vector for the predicate-generating instruction can be predicted to be set to true, prediction mechanism 404 sets the vector register that holds the predicate vector (or "control predicate") as the predicted result vector for the predicate-generating instruction. As another example, if prediction mechanism 404 determines that all of the active elements of the result vector for the predicate-generating instruction can be predicted to be set to false, prediction mechanism 404 sets a vector register that holds all false values as the predicted result vector for the predicate-generating instruction. (Note that the described embodiments include a dedicated vector register for which all elements are set to false.) Setting the predicted result vector in this way causes processor 102 (e.g., dispatch unit 208, execution units 202-206, etc.) to use the value in the register as the result vector for the predicate generating instruction when executing subsequent instructions.

Processor 102 then uses the predicted result vector to execute subsequent vector instructions that depend on the result from the predicate-generating instruction (step 712). In some embodiments, while dispatching one or more subsequent vector instructions that depend on the result of the predicate-generating instruction (i.e., that use the predicate vector generated by the predicate-generating instruction), processor 102 modifies the dependency of the subsequent vector instructions so that the subsequent vector instructions use the predicted result vector instead of the actual result of the predicate-generating instruction. Thus, the subsequent instructions use the predicted result vector (i.e., the value of the predicate vector for the predicate-generating instruction) as an input instead of using the actual result vector generated by the predicate-generating instruction.

As described below, using the predicted result vector includes performing other operations to ensure that the prediction was correct and to perform remedial actions when the prediction was incorrect.

Verification of Prediction

In both the embodiments shown in FIGS. 5-6, because the dependency of the subsequent vector instructions is modified and/or because the correctness of the prediction cannot be ensured until the predicted result vector is compared to the actual result vector, processor 102 treats the execution of instructions executed using the predicted result vector as speculative until the comparison can be made. Thus, monitoring mechanism 406 includes one or more mechanisms for recording that vector instructions are being executed based on the predicted result of the predicate-generating instruction. For example, in some embodiments, monitoring mechanism 406 includes a speculative execution indicator that is set upon dispatching a prediction micro-operation. While this indicator is set, processor 102 treats execution as speculative. While speculatively executing the subsequent instructions, processor 102 performs one or more operations to ensure that the operating state of the processor can be recovered to a pre-speculation operating state. For example, processor 102 may preserve the pre-speculation architectural state and may not commit the results from speculatively executed instructions to the architectural state of processor 102.

When the predicate-generating instruction eventually finishes execution and generates an actual result vector, monitoring mechanism 406 compares the predicted result vector to the actual result vector. If the predicted result vector and the actual result vector do not match, processor 102 determines that the prediction was incorrect and performs a remedial action. For example, processor 102 can delete/invalidate the speculative results, restore the processor state, and begin executing instructions following the predicate-generating instruction using the actual result vector.

On the other hand, if the predicted result vector matches the actual result vector generated by the predicate-generating instruction, processor 102 clears the speculative execution indicator, commits the speculative results, and continues execution.

Making Predictions Based on Prediction Accuracy

In some embodiments, prediction mechanism 404 includes a mechanism for tracking prediction accuracy for corresponding predicate-generating instructions. In these embodiments, the prediction accuracy can be kept as a value that represents a portion of the predictions that turned out to be correct and/or incorrect. For example, the prediction accuracy can be kept as a percentage of all the predictions made that proved to be correct. The prediction accuracy can be used as one of the factors in determining whether a predicate-generating instruction can be predicted. For example, if the prediction accuracy is below a threshold value (e.g., X % correct, last M predictions correct, etc.), prediction mechanism 404 may not make the prediction (or may only make the prediction if one or more of the other factors strongly indicates that the predicate-generating instruction is predictable).

In some embodiments, as part of tracking prediction accuracy, a value representing a confidence level can be kept based upon the past prediction(s) of one or more corresponding predicate-generating instructions. In these embodiments, the confidence level may be represented by a range of numerical values. For example, the confidence level in a given prediction can be represented by a value between −1 and +1, where −1 indicates a relatively high likelihood of a result vector for which all active elements are set to false, and +1 indicates a relatively high likelihood of a result vector for which all active elements are set to true. In these embodiments, a confidence level within a given distance of 0 indicates that, for the corresponding predicate-generating instruction, the values that the elements of a result vector are likely to be set is unclear. In these embodiments, prediction mechanism 404 may include one or more threshold confidence levels, below or above which a prediction is not made.

In addition, in the embodiments where prediction mechanism 404 generates the prediction micro-operation that is placed in the dispatch queue (i.e., in cases where the prediction micro-operation is generated in hardware instead of being inserted by the compiler), the prediction micro-operation may be selected based on the value in the confidence level. For example, using the range −1 to +1, if the confidence level is above 0.5, prediction mechanism 404 may predict a result vector for which the active elements are all set to true and select the prediction micro-operation accordingly; below −0.5, prediction mechanism 404 may predict a result vector for which the active elements are all set to false and select the prediction micro-operation accordingly; and between −0.5 and 0.5, prediction mechanism 404 not make a prediction.

The same holds for the selection of a vector register that is to function as a predicted result vector in the embodiments illustrated in FIG. 7.

In the described embodiments, as part of the comparison operation performed by monitoring mechanism 406, monitoring mechanism 406 updates the confidence level of the prediction and/or the prediction accuracy. If the elements in the predicted result vector are all set to true and the actual result vector contains all true, the confidence level for the prediction can be set to a value that is closer to 1 (e.g., can be adjusted toward 1 by 0.1, 0.5, 1, or another value). If the elements in the predicted result vector are all set to true and the actual result vector contains all false, the confidence level for the prediction can be set to a value that is closer to negative 1. If the elements in the predicted result vector are all set to true and the elements of the actual result vector contain a mixture of true and false, the confidence level for the prediction can be set to a value that is closer to 0. The opposite holds for the all-false prediction.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing vector instructions in a processor, comprising:
   while dispatching instructions at runtime, encountering a predicate-generating instruction;
   upon determining that a result of the predicate-generating instruction is predictable, dispatching a prediction micro-operation associated with the predicate-generating instruction, wherein the prediction micro-operation generates a predicted result vector for the predicate-generating instruction; and
   executing the prediction micro-operation, which comprises:
     optionally receiving a predicate vector;
     generating a predicted result vector, wherein, if the predicate vector is received, for each element of the predicted result vector for which the predicate vector is active, otherwise, for each element of the predicted result vector, generating the predicted result vector comprises setting the element of the predicted result vector to a predetermined value.

2. The method of claim 1, wherein the method further comprises:
   upon generating the predicted result vector, recording that subsequent vector instructions are being executed speculatively; and
   using the predicted result vector to execute subsequent vector instructions that depend on the result from the predicate-generating instruction.

3. The method of claim 1, wherein the method further comprises:
   dispatching the predicate-generating instruction;
   executing the predicate-generating instruction to generate an actual result vector;
   if the predicate vector is received, for each element of the predicted result vector for which the predicate vector is active, otherwise, for each element of the predicted result vector, comparing the element of the predicted result vector to the corresponding element of the actual result vector; and performing a remedial action if the comparison determines that the predicted result vector differs from the actual result vector.

4. The method of claim 3, wherein the method further comprises:
maintaining a record of an outcome of the comparison, wherein the record comprises a record of a prediction accuracy.

5. The method of claim 4, wherein when the prediction accuracy is below a threshold value, the method further comprises:
determining that the result of the predicate-generating instruction is unpredictable; and
dispatching the predicate-generating instruction;
wherein the execution unit is configured to:
execute the predicate-generating instruction to generate an actual result vector; and
use the actual result vector to execute subsequent vector instructions that depend on the result from the predicate-generating instruction.

6. The method of claim 4, wherein the record of the prediction accuracy comprises a confidence level represented by a value between a first value and a second value,
wherein when the value is within a predetermined distance of the first value, determining that a result of the predicate-generating instruction is predictable comprises determining that the active elements of the result vector are likely to be set to false;
wherein when the value is within a predetermined distance of the second value, determining that a result of the predicate-generating instruction is predictable comprises determining that the active elements of the result vector are likely to be set to true; and
wherein dispatching a prediction micro-operation associated with the predicate-generating instruction comprises dispatching a prediction micro-operation that sets the active elements of the predicted result vector to the value to which the active elements are determined to be likely to be set.

7. The method of claim 6, wherein the method further comprises:
when the confidence level is within a predetermined distance of a midpoint value midway between the first value and the second value,
determining that the result of the predicate-generating instruction is unpredictable; and
dispatching the predicate-generating instruction;
wherein the execution unit is configured to:
execute the predicate-generating instruction to generate an actual result vector; and
use the actual result vector to execute subsequent vector instructions that depend on the result from the predicate-generating instruction.

8. The method of claim 6, wherein the method further comprises:
adjusting the confidence level toward a midpoint value midway between the first value and the second value when the actual result vector includes both true and false elements;
adjusting the confidence level toward the first value, when the actual result vector includes only false elements; and
adjusting the confidence level toward the second value when the actual result vector includes only true elements.

9. The method of claim 1, wherein the method further comprises:
before dispatching subsequent vector instructions that depend on the predicate-generating instruction,
modifying the dependency of the subsequent vector instructions from using the actual result vector from the predicate-generating instruction to using the predicted result vector generated by the prediction micro-operation.

10. The method of claim 1, wherein the method further comprises:
upon determining that the result is not predictable for the predicate-generating instruction,
dispatching the predicate-generating instruction;
executing the predicate-generating instruction to generate an actual result vector; and
using the actual result vector to execute subsequent vector instructions that depend on the result from the predicate-generating instruction.

11. The method of claim 1, wherein determining that the result of the predicate-generating instruction is predictable comprises using one or more factors to determine if the result can be predicted for the predicate-generating instruction.

12. The method of claim 1, wherein the method further comprises:
receiving the prediction micro-operation decoded from a compiler-inserted prediction instruction.

13. The method of claim 1, wherein the method further comprises:
upon determining that a result vector of the predicate-generating instruction is predictable, generating a prediction micro-operation.

14. The method of claim 1, wherein the predicate-generating instruction comprises a GeneratePredicates instruction or a comparison instruction.

15. A processor that executes vector instructions, comprising:
an execution unit in the processor; and
a dispatch unit in the processor;
wherein, while dispatching instructions at runtime, upon encountering a predicate-generating instruction, the dispatch unit is configured to determine if a result of the predicate-generating instruction is predictable;
upon determining that the result of the predicate-generating instruction is predictable, the dispatch unit is configured to dispatch a prediction micro-operation associated with the predicate-generating instruction, wherein the prediction micro-operation generates a predicted result vector for the predicate-generating instruction; and
wherein the execution unit is configured to execute the prediction micro-operation, which comprises:
optionally receiving a predicate vector;
generating a predicted result vector, wherein, if the predicate vector is received, for each element of the predicted result vector for which the predicate vector is active, otherwise, for each element of the predicted result vector, generating the predicted result vector comprises setting the element of the predicted result vector to a predetermined value.

16. The processor of claim 15, wherein, upon generating the predicted result vector, the execution unit is configured to:
record that subsequent vector instructions are being executed speculatively; and
use the predicted result vector to execute subsequent vector instructions that depend on the result from the predicate-generating instruction.

17. The processor of claim 15, wherein the dispatch unit is further configured to dispatch the predicate-generating instruction, and the execution unit is configured to:
execute the predicate-generating instruction to generate an actual result vector;

if the predicate vector is received, for each element of the predicted result vector for which the predicate vector is active, otherwise, for each element of the predicted result vector, compare the element of the predicted result vector to the corresponding element of the actual result vector; and perform a remedial action if the comparison determines that the predicted result vector differs from the actual result vector.

18. The processor of claim 17, further comprising:
a monitoring mechanism in the processor, wherein the monitoring mechanism is configured to maintain a record of an outcome of the comparison, wherein the record comprises a record of a prediction accuracy.

19. The processor of claim 18, wherein when the prediction accuracy is below a threshold value, the dispatch unit is configured to:
determine that the result of the predicate-generating instruction is unpredictable; and
dispatch the predicate-generating instruction;
wherein the execution unit is configured to:
execute the predicate-generating instruction to generate an actual result vector; and
use the actual result vector to execute subsequent vector instructions that depend on the result from the predicate-generating instruction.

20. The processor of claim 18, wherein the record of the prediction accuracy comprises a confidence level represented by a value between a first value and a second value, and
wherein when determining that a result of the predicate-generating instruction is predictable,
when the value is within a predetermined distance of the first value, the dispatch unit is configured to determine that the active elements of the result vector are likely to be set to false; and
when the value is within a predetermined distance of the second value, the dispatch unit is configured to determine that the active elements of the result vector are likely to be set to true; and
wherein when dispatching a prediction micro-operation associated with the predicate-generating instruction, the dispatch unit is configured to dispatch a prediction micro-operation that sets the active elements of the predicted result vector to the value to which the active elements are determined to be likely to be set.

21. The processor of claim 20, wherein when the confidence level is within a predetermined distance of a midpoint value midway between the first value and the second value, the dispatch unit is configured to:
determine that the result of the predicate-generating instruction is unpredictable; and
dispatch the predicate-generating instruction;
wherein the execution unit is configured to:
execute the predicate-generating instruction to generate an actual result vector; and
use the actual result vector to execute subsequent vector instructions that depend on the result from the predicate-generating instruction.

22. The processor of claim 20, wherein the monitoring mechanism is configured to:
adjust the confidence level toward a midpoint value midway between the first value and the second value when the actual result vector includes both true and false elements;
adjust the confidence level toward the first value when the actual result vector includes only false elements; and
adjust the confidence level toward the second value when the actual result vector includes only true elements.

23. The processor of claim 15, wherein, before dispatching subsequent vector instructions that depend on the predicate-generating instruction, the dispatch unit is configured to modify the dependency of the subsequent vector instructions from using the actual result vector from the predicate-generating instruction to using the predicted result vector generated by the prediction micro-operation.

24. The processor of claim 15, wherein, upon determining that the result is not predictable for the predicate-generating instruction, the dispatch unit is configured to:
dispatch the predicate-generating instruction;
wherein the execution unit is configured to:
execute the predicate-generating instruction to generate an actual result vector; and
use the actual result vector to execute subsequent vector instructions that depend on the result from the predicate-generating instruction.

25. The processor of claim 15, wherein when determining that the result of the predicate-generating instruction is predictable, the dispatch unit is configured to use one or more factors to determine if the result can be predicted for the predicate-generating instruction.

26. The processor of claim 15, wherein the dispatch unit is configured to receive the prediction micro-operation decoded from a compiler-inserted prediction instruction.

27. The processor of claim 15, wherein upon determining that a result vector of the predicate-generating instruction is predictable, the dispatch unit is configured to generate the prediction micro-operation.

28. A computer system that executes vector instructions, comprising:
a processor;
a memory coupled to the processor, wherein the memory is configured to store data and instructions for the processor;
an execution unit in the processor; and
a dispatch unit in the processor;
wherein, while dispatching instructions at runtime, upon encountering a predicate-generating instruction, the dispatch unit is configured to determine if a result of the predicate-generating instruction is predictable;
upon determining that the result of the predicate-generating instruction is predictable, the dispatch unit is configured to dispatch a prediction micro-operation associated with the predicate-generating instruction, wherein the prediction micro-operation generates a predicted result vector for the predicate-generating instruction; and
wherein the execution unit is configured to execute the prediction micro-operation, which comprises:
optionally receiving a predicate vector;
generating a predicted result vector, wherein, if the predicate vector is received, for each element of the predicted result vector for which the predicate vector is active, otherwise, for each element of the predicted result vector, generating the predicted result vector comprises setting the element of the predicted result vector to a predetermined value.

29. A method for executing a vector instruction in a processor, comprising:
while dispatching instructions at runtime, encountering a predicate-generating instruction and receiving a predicate vector for the predicate-generating instruction;
determining that a result vector for the predicate-generating instruction is predictable;

using an existing value from a processor register as a predicted result vector for the predicate-generating instruction; and before dispatching subsequent vector instructions that depend on the predicate-generating instruction for execution, modifying the dependency of the subsequent vector instructions from an actual result vector from the predicate-generating instruction to the predicted result vector so that the predicted result vector is used to execute the subsequent vector instructions instead of the actual result vector.

30. The method of claim 29,
wherein determining that the result vector for the predicate-generating instruction is predictable comprises determining that all active elements of the result vector are predictable as being set to true; and
wherein using the existing value from the processor register as the predicted result vector comprises using the predicate vector of the predicate-generating instruction as a predicted result vector for the predicate-generating instruction.

31. The method of claim 29,
wherein determining that the result vector for the predicate-generating instruction is predictable comprises determining that all active elements of the result vector are predictable as being set to false; and
wherein using the existing value from the processor register as the predicted result vector comprises using a preset predicate register of all false elements as a predicted result vector for the predicate-generating instruction.

32. The method of claim 29, wherein the method further comprises:
dispatching the predicate-generating instruction;
executing the predicate-generating instruction to generate an actual result vector;
if the predicate vector is received, for each element of the predicted result vector for which the predicate vector is active, otherwise, for each element of the predicted result vector, comparing the element of the predicted result vector to the corresponding element of the actual result vector; and
performing a remedial action if the comparison determines that the predicted result vector differs from the actual result vector.

33. The method of claim 32, wherein the method further comprises:
maintaining a record of an outcome of the comparison, wherein the record comprises a record of a prediction accuracy.

34. The method of claim 33, wherein when the prediction accuracy is below a threshold value, the method further comprises:
determining that a result vector for the predicate-generating instruction is unpredictable; and
dispatching the predicate-generating instruction;
wherein the execution unit is configured to:
execute the predicate-generating instruction to generate an actual result vector; and
use the actual result vector to execute subsequent vector instructions that depend on the result from the predicate-generating instruction.

35. The method of claim 33, wherein the record of the prediction accuracy comprises a confidence level represented by a value between a first value and a second value,
wherein when the value is within a predetermined distance of the first value, determining that a result of the predicate-generating instruction is predictable comprises determining that the active elements of the result vector are likely to be set to false;
wherein when the value is within a predetermined distance of the second value, determining that a result of the predicate-generating instruction is predictable comprises determining that the active elements of the result vector are likely to be set to true; and
wherein when the confidence level is within a predetermined distance of a midpoint value midway between the first value and the second value, determining that the result of the predicate-generating instruction is unpredictable.

36. The method of claim 35, wherein the method further comprises:
adjusting the confidence level toward a midpoint value midway between the first value and the second value when the actual result vector includes both true and false elements;
adjusting the confidence level toward the first value, when the actual result vector includes only false elements; and
adjusting the confidence level toward the second value when the actual result vector includes only true elements.

37. The method of claim 29, wherein the method further comprises:
upon determining that the result is not predictable for the predicate-generating instruction,
dispatching the predicate-generating instruction;
executing the predicate-generating instruction to generate an actual result vector; and
using the actual result vector to execute subsequent vector instructions that depend on the result from the predicate-generating instruction.

38. A processor for executing a vector instruction, comprising:
an execution unit in the processor; and
a dispatch unit in the processor;
wherein while dispatching instructions at runtime, upon encountering a predicate-generating instruction and receiving a predicate vector for the predicate-generating instruction, the dispatch unit is configured to determine whether a result vector for the predicate-generating instruction is predictable;
upon determining that a result vector for the predicate-generating instruction is predictable, the dispatch unit is configured to set an existing value from a processor register as a predicted result vector for the predicate-generating instruction; and
before dispatching subsequent vector instructions that depend on the predicate-generating instruction for execution, the dispatch unit is configured to modify the dependency of the subsequent vector instructions from an actual result vector from the predicate-generating instruction to the predicted result vector so that the predicted result vector is used by the execution unit to execute the subsequent vector instructions instead of the actual result vector.

39. The processor of claim 38, wherein determining that the result vector is predictable comprises determining that all active elements of the result vector are predictable as being set to true; and
upon determining that all active elements of the result vector are predictable as being set to true, the dispatch unit is configured to set the predicate vector as a predicted result vector for the predicate-generating instruction.

40. The processor of claim 38, wherein determining that the result vector is predictable comprises determining that all active elements of the result vector are predictable as being set to false; and upon determining that all active elements of the result vector are predictable as being set to false, the dispatch unit is configured to set a preset vector of all false elements as a predicted result vector for the predicate-generating instruction.

* * * * *